INFORMATION VERIFICATION CIRCUIT

Filed Nov. 26, 1962 7 Sheets-Sheet 1

INVENTORS S. KANDEL
M. E. KROM
C. C. NIELSON
A. ZAROUNI

BY R. C. Winter
ATTORNEY

INFORMATION VERIFICATION CIRCUIT

Sept. 14, 1965 S. KANDEL ETAL 3,206,554

INFORMATION VERIFICATION CIRCUIT

Filed Nov. 26, 1962 7 Sheets-Sheet 3

INFORMATION VERIFICATION CIRCUIT

Filed Nov. 26, 1962 7 Sheets-Sheet 4

INFORMATION VERIFICATION CIRCUIT

INFORMATION VERIFICATION CIRCUIT

United States Patent Office 3,206,554

Patented Sept. 14, 1965

3,206,554

INFORMATION VERIFICATION CIRCUIT

Samuel Kandel and Myron E. Krom, Columbus, and Carl C. Nielson, Granville, Ohio, and Alfred Zarouni, Middletown, N.J., assignors to Bell Telephone Laboratories, Incorporated, New York, N.Y., a corporation of New York Filed Nov. 26, 1962, Ser. No. 240,058

10 Claims. (Cl. 179—18)

This invention relates generally to switching equipment in an automatic telephone system, and particularly to switching equipment which causes the verification of swtiching control information provided by a telephone customer.

In the past certain special services have been made available to telephone customers to provide them with features which render their telephone usage more convenient and more flexible. A typical example of these services is centralized abbreviated dialing, wherein a customer is required to dial only a two or three digit code in order to be connected to another customer whose location would otherwise require the dialing of a full directory number.

Such services are advantageously provided by common equipment at a centralized location such as a telephone central office. The particular service is thereupon available to be activated and controlled by the customer, using the telephone subset at the customer's premises.

For example, a customer provided with the abbreviated dialing service may be permitted to make additions to his abbreviated dialing repertory at the central office. This is accomplished merely by dialing an alterting code which causes the connection of suitable common memory equipment to the line. After completion of the connection, the customer dials an abbreviated dialing code followed by the full directory number to which this particular code henceforth corresponds. Thus, the customer controls the common memory write function. Thereafter, subsequent calls to that directory number by the special service customer necessitates only the dialing of another appropriate altering code followed by the abbreviated code, thereby enabling the common memory read function.

It has been recognized that means should be provided whereby the customer may verify that he has activated the specific service during the write function and that the memory equipment has received and registered the intended directory number for that service. The expdient resorted to in the past requires that the customer initiate another call in order to engage the memory equipment a second time. Upon connection, a varification code is dialed followed by the directory number information which is to be verified. The equipment thereupon returns and audible announcement or a suitable matching tone to inform the customer of the verification. Such an arrangement presents a distinct disadvantage in that the customer is required to make a subsequent call in order to verify a previous call thereby diminishing the convenience which the service seeks to provide.

In view of the foregoing, a general object of this invention is to make it possible for a customer to receive verification of the switching control information provided by him to activate his service, without requiring the initiation of an additional call.

Another object is to provide this verification automatically without necessitating special instructions to the customer.

These and other objects of the invention are attained in accordance with an exemplary embodiment comprising an automatic switching system arranged for centralized abbreviated dialing wherein the control circuit which causes the connection of the common memory equipment to the customer's line is modified so as to recognize the completion of the write function and to thereupon automatically enable the read function. The registered abbreviated dialing code (AD code) is utilized to read out of the memory the corresponding directory number stored there during the write function. This information is returned to the central office register equipment as on a normal AD call, and the connection is completed to the indicated directory number thereby providing positive verification of the information which has been stored in the memory during the write function. Other equipment is also provided to return a distinctive tone to the customer upon the completion of the write function, thereby permitting the customer, if he so desires, to abandon the call at that point and thus inhibit the automatic enablement of the read function.

A feature of this invention is the automatic verification of switching control information stored under customer control in a central office memory.

Another feature of this invention is in the arrangement of equipment which causes the inhibition of the automatic verification of switching control information stored under customer control in a central office memory in response to an abandonment of the call by the special servise customer.

Another feature of this invention is the provision of a distinct audible signal to the special service customer upon completion of the write function and prior to the automatic enablement of the read function.

The foregoing objects and features of the present invention, as well as others, will be apparent from the subsequent description of the exemplary embodiment shown in the drawing, in which.

Figure 1:
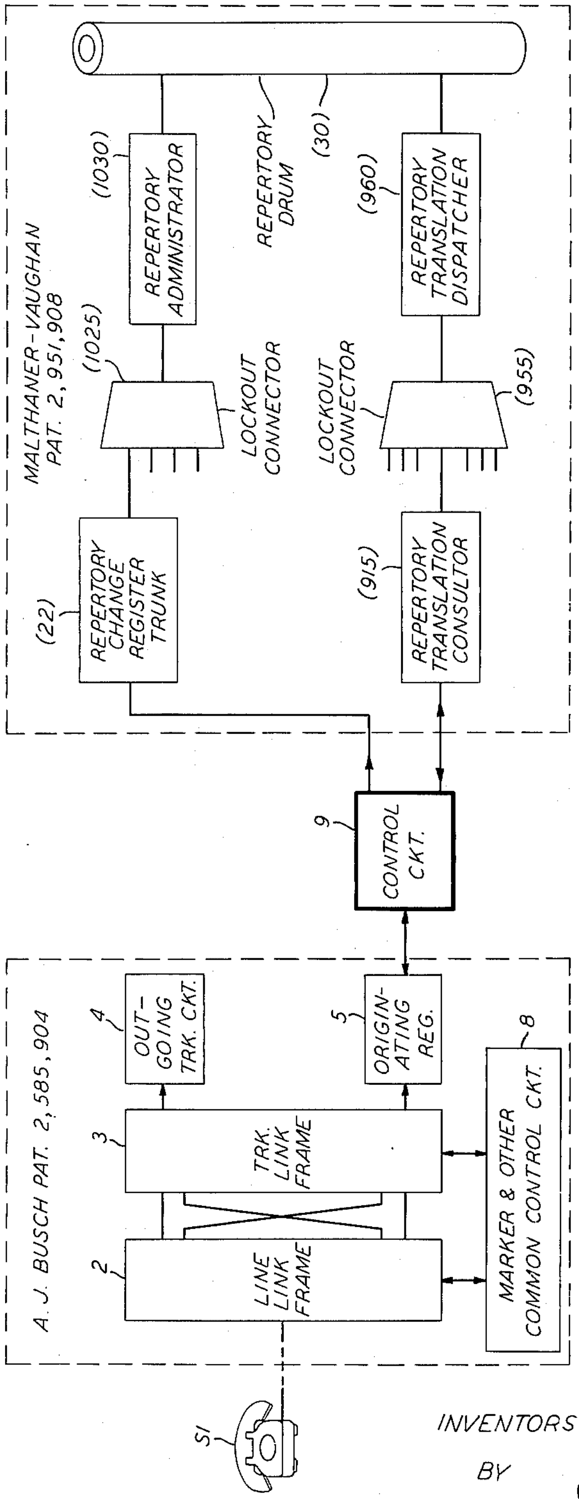
FIG. 1 is a block diagram showing the interrelation of the component elements of the exemplary embodiment.

in which the various figures should be placed.

It will be noted that FIGS. 2 through 7 employ a type of notation referred to as "Detached Contact" in which an "X," shown intersecting a conductor, represents a normally open "make" contact of a relay, and a "bar," shown intersecting a conductor at right angles, represents a normally closed "break" contact of a relay; "normally" referring to the unoperated condition of the relay. The principles of this type of notation are described in an article entitled "An Improved Detached-Contact-Type of Schematic Circuit Drawing" by F. T. Meyer, in the September, 1955, publication of American Institute of Electrical Engineers Transactions, Communications and Electronics, volume 74, pages 505–513.

For the purpose of illustration, as discussed in detail hereinafter, the various figures of the drawing employ apparatus disclosed in previously issued patents. In order to facilitate a clear understanding of the instant invention, such apparatus designations have been retained and are enclosed in parentheses to facilitate cross reference with the patent from which they were derived.

The present invention is illustrated in this embodiment in a common control automatic telephone system arranged for centralized abbreviated dialing. In the embodiment, the common control system disclosed in A. J. Busch Patent 2,585,904, issued February 19, 1952, is modified by the addition of a common repertory memory and associated equipment of the type set forth in W. A. Malthaner et al. Patent 2,951,908, issued September 6, 1960. It is to be understood, however, that the present invention is not limited to use with a telephone system so arranged but may be utilized with other types of switching systems.

To facilitate an understanding of the relationship between the presently disclosed embodiment and the disclosures of the above noted prior patents, there is given below in Table I a cross reference between elements of the instant disclosure and of the cited patents. Specifically, in this table the apparatus components cited in this disclosure are listed and indexed according to the corresponding figures in the cited patents. In the subsequent detailed description, reference may be made back to this table as an aid in understanding the presently disclosed embodiment of our invention:

TABLE I

A. J. BUSCH PATENT 2,585,904

| Apparatus Component | Fig. No. |
|---|---|
| Relay A0 | |
| Relay A1 | 184 |
| Relay A2 | |
| Relay A4 | |
| Relay A7 | 218 |
| Relay AS | |
| Relay C0 | |
| Relay C1 | 184 |
| Relay C2 | |
| Relay C4 | |
| Relay C7 | 55 |
| Relay CT0 | |
| Relay CU0 | 71 |
| Relay FT0 | |
| Relay FU0 | 55 |
| Relay LC | 219 |
| Relay LE | |
| Relay ON | 220 |
| Relay ON1 | |
| Relay P1 | |
| Relay P2A | 219 |
| Relay RA | |
| Relay VF0 | 71 |

W. A. MALTHANER ET AL. PATENT 2,951,908

| Apparatus Component | Fig. No. |
|---|---|
| AND gate 916 | |
| AND gate 918 | |
| Toggles 917 | 26 |
| Toggles 924 | |
| Toggles 931 | |
| AND gate 919 | 27 |
| Toggles 925 | |
| Toggles 933 | |
| Monopulser 935 | 28 |
| AND gate 949 | |
| Toggles 934 | 29 |
| AND gate 950 | |
| A relay 981 | |
| S relay 982 | |
| B relay 983 | |
| Gated amplifier 985 | |
| Dial tone generator 986 | 35 |
| Transformer 987 | |
| Monopulser 988 | |
| Resistance RB | |
| AND gate 1018 | 34 |
| Toggles 1019 | |
| Toggles 984 | 38 |

It is to be noted that the Malthaner et al. disclosure utilizes solid state and vacuum tube circuit components to perform the various circuit functions. In order to simplify disclosure of the present invention, the Malthaner et al. circuit components are utilized to control relay devices in the embodiment as will be more apparent hereinafter. Accordingly, techniques well known in the art, such as the insertion of flip flops serially in various leads between the Malthaner et al. solid state components and the relay components, are utilized in this illustrative embodiment to provide the necessary relay activating power. Suitable examples of this technique are shown in B. W. Lee Patent 2,991,449, issued July 4, 1961.

The invention described herein is particularly concerned with apparatus in control circuit 9. Control circuit 9 is represented by the block shown with heavy lines in FIG. 1 in order to distinguish it from the prior art equipment units, which are neither shown nor described in detail except where necessary for a complete understanding of the invention.

For the purpose of illustration, it is intended that the apparatus of line link frame 2, trunk link frame 3, outgoing trunk 4, originating register 5, and common control circuit 8 correspond to apparatus disclosed in the Busch patent and that repertory change register trunk (22), lockout connector (1025), repertory administrator (1030), repertory translation consultor (915), lockout connector (955), repertory translation dispatcher (960), and repertory drum (30) correspond to apparatus disclosed in the Malthaner et al. patent. For a more complete understanding of the construction and operation of these components, the appropriate patent, as set forth above, may be consulted.

*I. General description*

The interrelation and function of equipment units of the exemplary embodiment will now be described with reference to FIG. 1 wherein the interconnections between circuit blocks have been designated by means of arrows to show the direction of circuit action. A station S1, which is provided with abbreviated dialing service, is shown connected to line link frame 2. Outgoing trunk 4 and originating register 5 are shown connected to trunk link frame 3. As is fully disclosed in the Busch patent, lines terminated on line link frames and trunks terminated on trunk link frames are interconnected when active by means of crossbar switches on these frames and by interframe junctors. All such interconnections are effected under control of a common group of circuits including marker and other common control circuits 8.

Control circuit 9 is shown interconnected between originating register 5 of the Busch system and repertory change register trunk (22) and repertory translation consultor (915) of the Malthaner et al. system. As set forth in detail in the Malthaner et al. system, repertory changer register trunk (22), lockout connector (1025) and repertory administrator (1030) are utilized to perform the write function on an AD call and to thereby store an AD code and associated directory number in repertory drum (30). Repertory translation consultor (915), lockout connector (955), and repertory translation dispatcher (960) are utilized to perform to read function on an AD call and to thereby read out the appropriate directory number from repertory drum (30) in response to the dialing of an AD code by the AD customer.

Thus in the instant invention, control circuit 9 is interposed between the circuits of the cited patents such that when an AD customer dials a code indicating a write function, repertory change register trunk (22) is connected to the line to accept the dialed information. Upon completion of the write function, control circuit 9 is arranged to provide a distinctive tone signal to the customer to permit abandonment of the call if verification of the dialed information is not deemed necessary.

Assuming that the call is not abandoned, control circuit 9 enables the read function automatically by calling in repertory translation consultor (915) as if the customer had initiated an AD call to the newly recorded location. The stored directory number is thus read out of repertory drum (30) and is returned to originating register 5. The originating register thereupon causes the call to be completed in the conventional manner. Thus, assuming that the directory number indicates a customer in another central office area, a connection is established from station S1, via outgoing trunk circuit 4 to that customer's line.

Reference will now be made to FIGS. 2 through 7 in order to describe in detail the invention as portrayed in the illustrative embodiment.

*II. Detailed description—Abbreviated dialing read function (FIGS. 1, 2, 3, 4 and 5)*

As explained in general terms in Section I of this application, the verification of the information stored in the memory during the write function is accomplished by performing the read function just as though the customer had initiated a conventional AD call to the newly recorded location. In order to clearly understand this novel manner of verification, the customer-controlled read function as manifested during the course of completing such a conventional AD call will be described first in this section of the detailed description.

When the customer at station S1, of FIG. 1, lifts the receiver to initiate a call, marker and other common control circuits 8 cause the connection of originating register 5 to the line as set forth in detail in the Busch disclosure. Dial tone is thereupon returned to station S1 to indicate that dialing may begin.

Special service lines, such as station S1, do not utilize the abbreviated dialing privilege on every call. Therefore, it is necessary that some means be provided so that the equipment will recognize the customer's intention to use the service. For the purpose of explanation, we shall assume that the customer has been instructed to enable the read function by dialing the digit "one" followed by the appropriate AD code.

Figures 2, 8, 9:
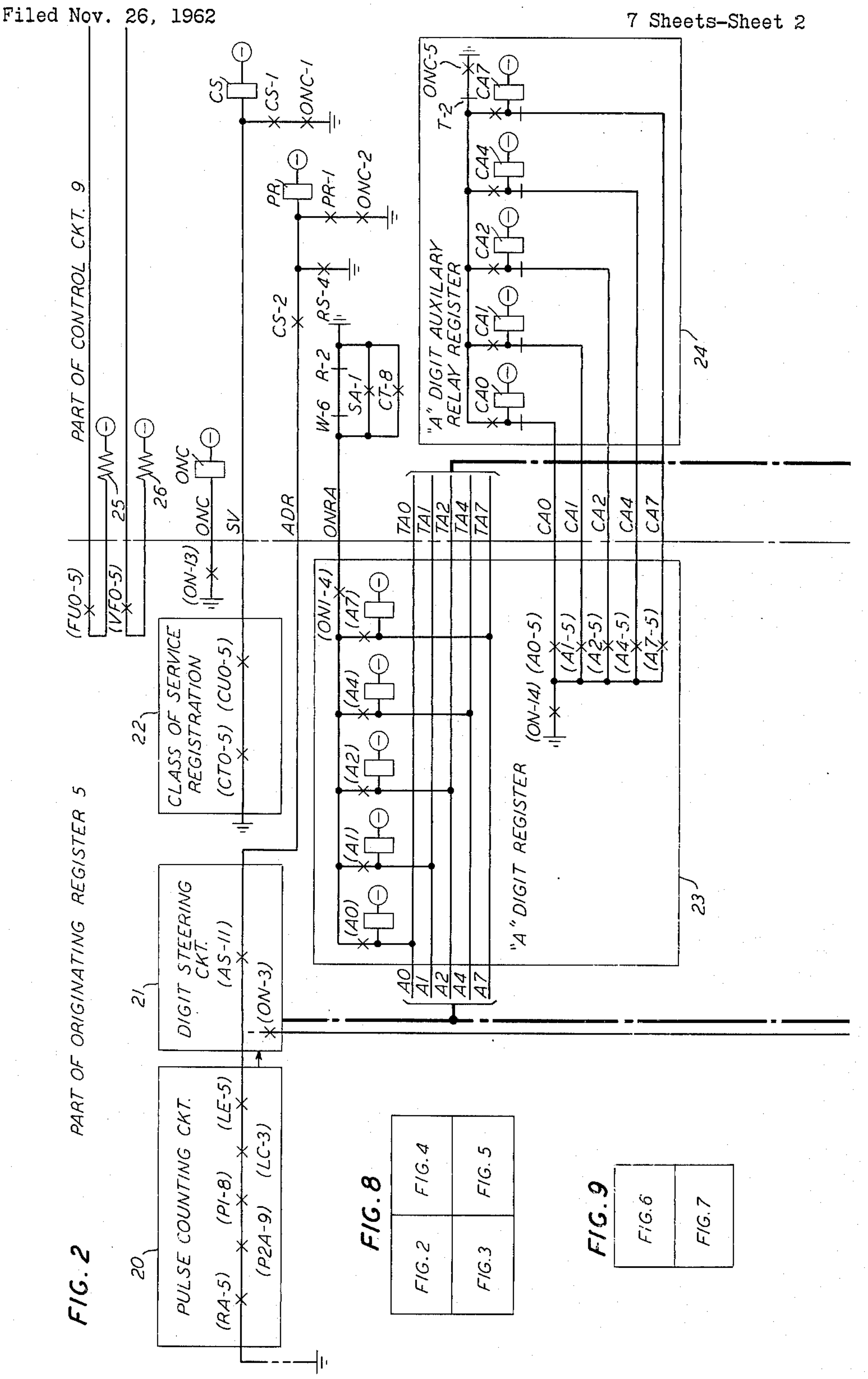
FIGS. 2 through 7 are diagrams in schematic form showing in greater detail the interrelation of the components of the exemplary embodiment.
FIGS. 8 and 9 are key charts depicting the position in which the various FIGS. should be placed.

Referring now to FIG. 2, when originating register 5 is seized, relay ONC in control circuit 9 operates from ground provided through operated make contact (ON–13) in originating register 5. As disclosed in detail in the Busch patent, relay (ON) remains enabled during the functioning of originating register 5; therefore, relay ONC remains operated under control of the register.

Each AD customer will be assigned to a specific class of service indicating the AD privilege. This class of service number may, for example, be 00. Accordingly, as shown in detail in the Busch patent, relays (CT0) and (CU0) are operated in the originating register. Contact 5 on each of these relays, illustrated in the class of service registration circuit 22 of originating register 5, may advantageously be arranged to provide ground on lead SV to operate relay CS in control circuit 9. Relay CS thereupon locks operated through its make contacts CS–1 and previously operated make contacts ONC–1 to ground.

As disclosed in detail in the Busch patent, an initial dialed digit "one" is not registered in A digit register 23. Accordingly, the circuit configuration in the Busch patent which indicates the dialing of this digit may advantageously be arranged in conjunction with the operated CS relay to indicate to control circuit 9 that an AD customer desires to enable the AD read function. Thus when the customer dials a digit "one" alerting code, relay PR operates from ground provided through contacts in pulse counting circuit 20 and digit steering circuit 21 in originating register 5, over lead ADR through operated make contacts CS–2. Relay PR locks operated through PR–1 and ONC–2 to ground. Thus at this point, control circuit 9 recognizes that a customer entitled to AD service intends to control the read function in order to complete an AD call.

After dialing the alerting code digit "one," the customer dials the appropriate AD code, which may, for example, comprise any two-digit number from 20 to 99. These digits are registered in the A and B digit registers 23 and 30, respectively, as set forth in detail in the Busch disclosure. The corresponding A0–A7 and B0–B7 relays operate in originating register 5.

Figure 3:
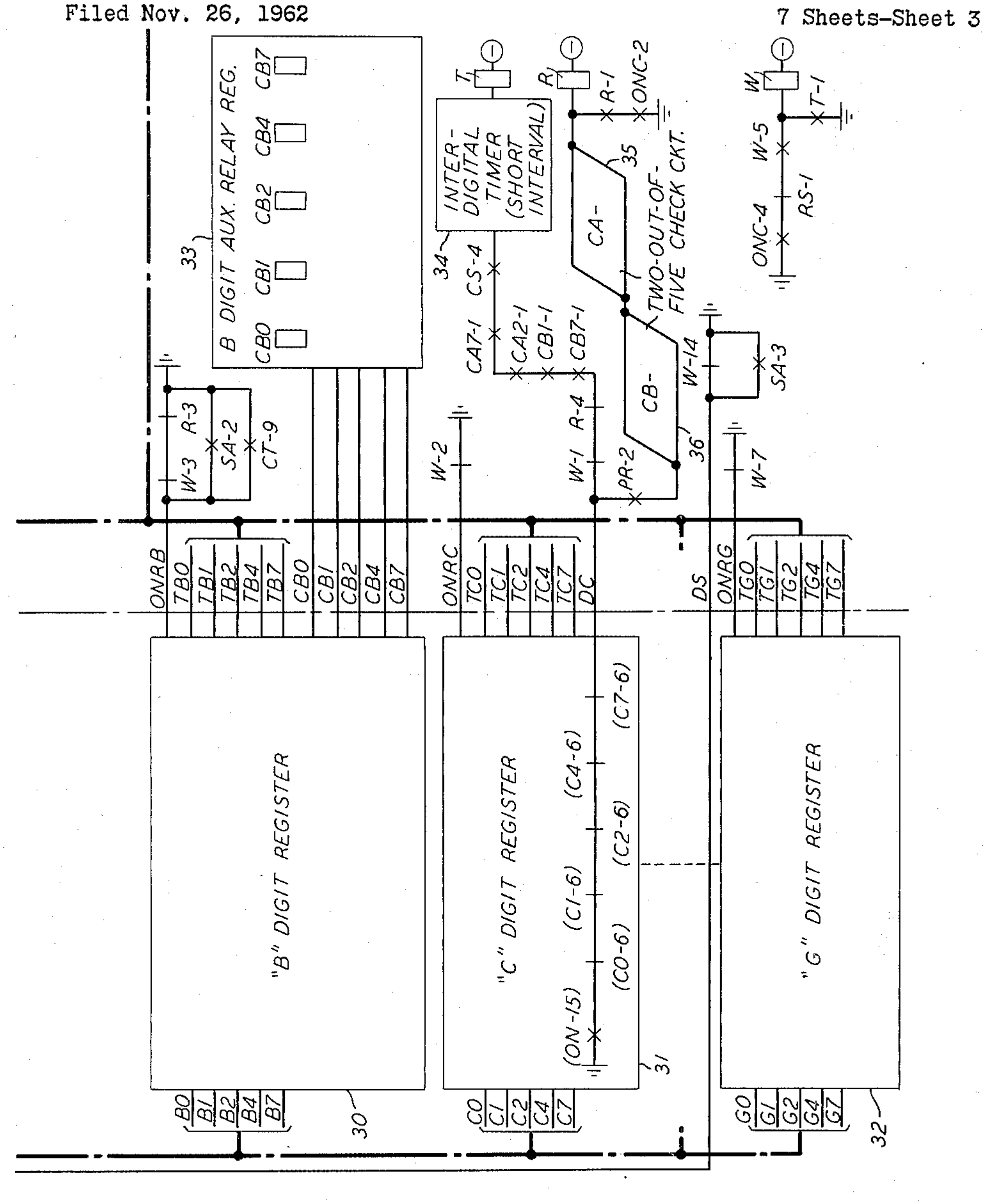

Control circuit 9 comprises A and B digit auxiliary registers 24 and 33, respectively, which are arranged as shown in FIGS. 2 and 3 to respond to ground present on the CA0–CA7 and CB0–CB7 leads, and to thereby register the two-digit AD code dialed into originating register 5. The successful operation of two of the CA0–CA7 and two of the CB0–CB7 relays completes the operate path of relay R, FIG. 3, which extends from battery through the winding of relay R, through check circuits 35 and 36, operated make contacts PR–2, via lead DC through a chain of released C0–C7 relays in C digit register 31 to ground on operated make contact (ON–15). Relay R locks operated through operated make contacts R–1 and ONC–2 to ground.

The A and B digit registers 23 and 30, respectively, are restored to normal by the operation of break contacts R–2 and R–3 which remove the register relays locking ground provided via leads ONRA and ONRB. Digit registers 23 through 32 in originating register 5 are thus available to register the directory number which will be read out of the memory equipment as will be more apparent from the following description.

As described in detail in the Malthaner et al. patent, repertory translation consultor (915), when activated, utilizes the registered AD code and equipment location information to cause the reading from the memory of the corresponding called directory number. At this point, as shown on FIGS. 2 and 3 and described earlier, digit registers 24 and 33 have recorded the dialed AD code. The corresponding CA0–CA7 and CB0–CB7 make contacts are thus enabled in FIG. 4 in preparation to provide this information to repertory translation consultor (915).

The Busch patent discloses in detail the registration of the calling line equipment information in originating register 5. As shown on FIG. 2, the corresponding (FUO–5) and (VFO–5) make contacts (typical) are therefore enabled preparatory to providing the calling line identity information to repertory translation consultor (915) by placing a negative potential on the associated leads.

Figure 4:
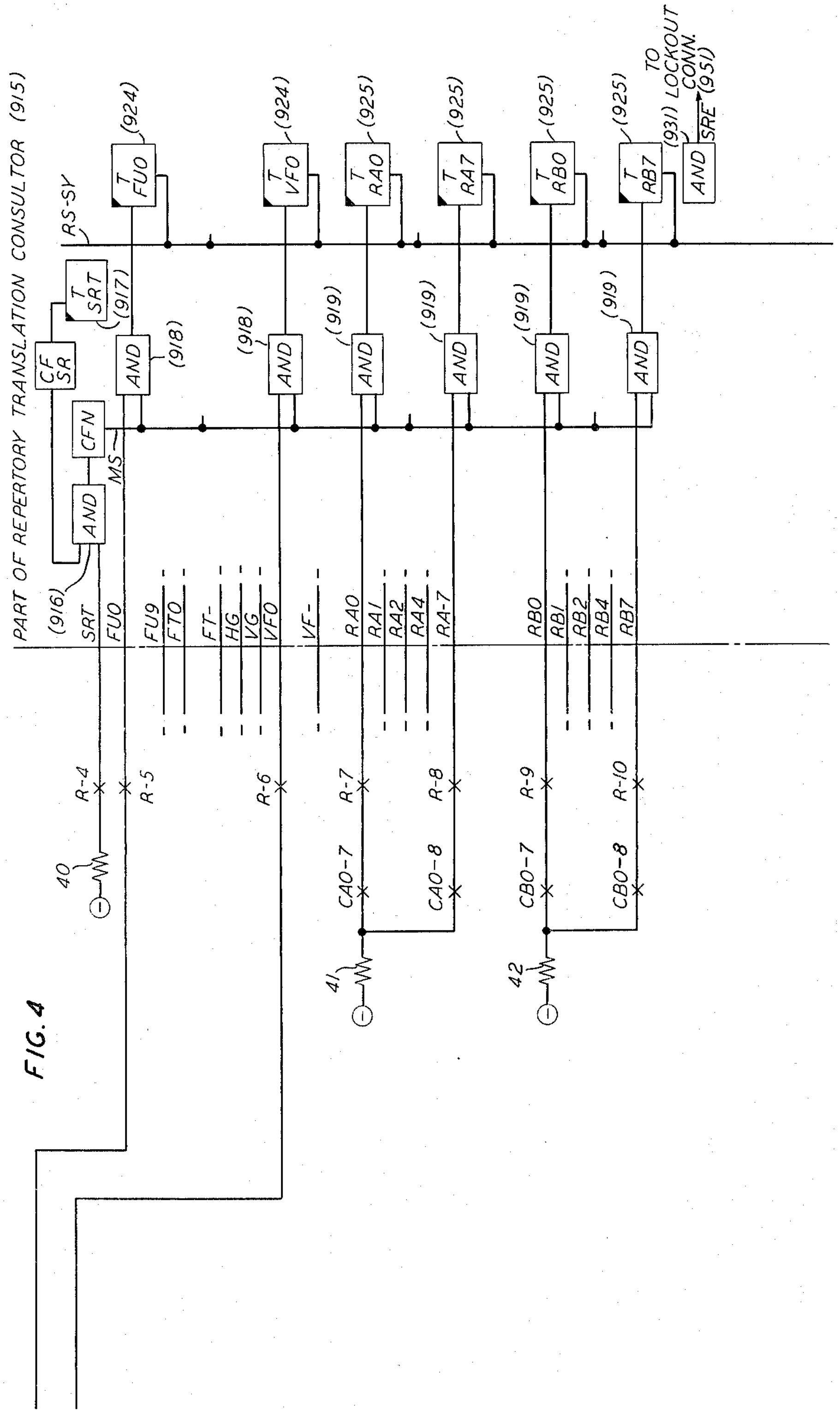

Accordingly, the previously described operation of relay R closes make contacts R–5 through R–10 in FIG. 4 to partially enable AND gates (918) and (919) in repertory translation consultor (915).

The negative potential provided on lead SRT via operated make contact R–4 in conjunction with the normal state of toggle (917) enables AND gate (916) as set forth in detail in the Malthaner et al. patent. The consequent negative signal pulse applied to lead MS enables AND gates (918) and (919) to cause the registration of the line equipment information and AD code in toggles (924) and (925), respectively.

As further described in the Malthaner et al. patent, the subsequent enabling of AND gate (931) in response to the registration of this information applies a positive signal voltage over the SRE lead which enables lockout connector (951), FIG. 1, to establish a connection between repertory translation consultor (915) and repertory translation dispatcher (960). When this connection is established, the line equipment number and AD code recorded in toggles (924) and (925) of FIG. 4, respectively, are dispatched to repertory translation dispatcher (960), FIG. 1.

As set forth in the Malthaner et al. patent, when the line equipment number of a calling customer's line and a repertory code dialed by the calling customer are dispatched to repertory translation dispatcher (960), this circuit will match the line equipment number received from the repertory translation consultor (915) with the successive line equipment numbers recorded on repertory drum (30) to locate the calling customer's individual repertory area on repertory drum (30). When a match is obtained, repertory translation dispatcher (960) will then match the repertory code dialed by the calling customer and received from repertory translation consultor (915) with the repertory codes recorded on repertory drum (30) on the calling customer's individual repertory area. When a match is obtained, repertory translation dispatcher (960) will read the directory number recorded on repertory drum (30), which the calling customer has assigned to the dialed repertory code, and dispatch this number via lockout connector (955) to repertory translation consultor (915). The called office code portion of this number is thus recorded in toggles (933), shown in FIG. 5, and the number portion of this directory number is recorded in the thousands, hundreds, tens, and units toggles (934).

Therefore, at this point repertory translation consultor (915) has forwarded the AD code in conjunction with the line equipment information and has received in return the directory number corresponding to that specific AD code.

As disclosed in the Malthaner et al. patent, the output of toggles (933) and (934) partially enable AND gates (949) and (950), respectively. The subsequent operation of RM monopulser (935), may advantageously be arranged such that the negative signal output on lead RM enables flip-flop 50 in control circuit 9 to thereby operate relay CT. Relay CT thereupon locks operated by an obvious circuit. The negative signal output on lead RM may also be advantageously arranged such that, when applied through an inverter such as inverter (960), it enables those AND gates (949) and (950), which are associated with previously operated toggles (933) and (934) as hereinbefore described. The enabling of AND gates (949) and (950) are arranged to enable the corresponding flip-flops 51 and 52 in control circuit 9 so as to provide ground potential on the associated TAO–7 through TGO–7 leads which extend through control circuit 9 via operated contacts on relay CT to the A through G registers of FIGS. 2 and 3 in originating register 5. The appropriate A0–A7, G0–G7 registration relays are thus operated in originating register 5 to record the called directory number corresponding to the dialed AD code. These relays lock operated from ground present on the associated ONRA through ONRG leads.

Figure 5:
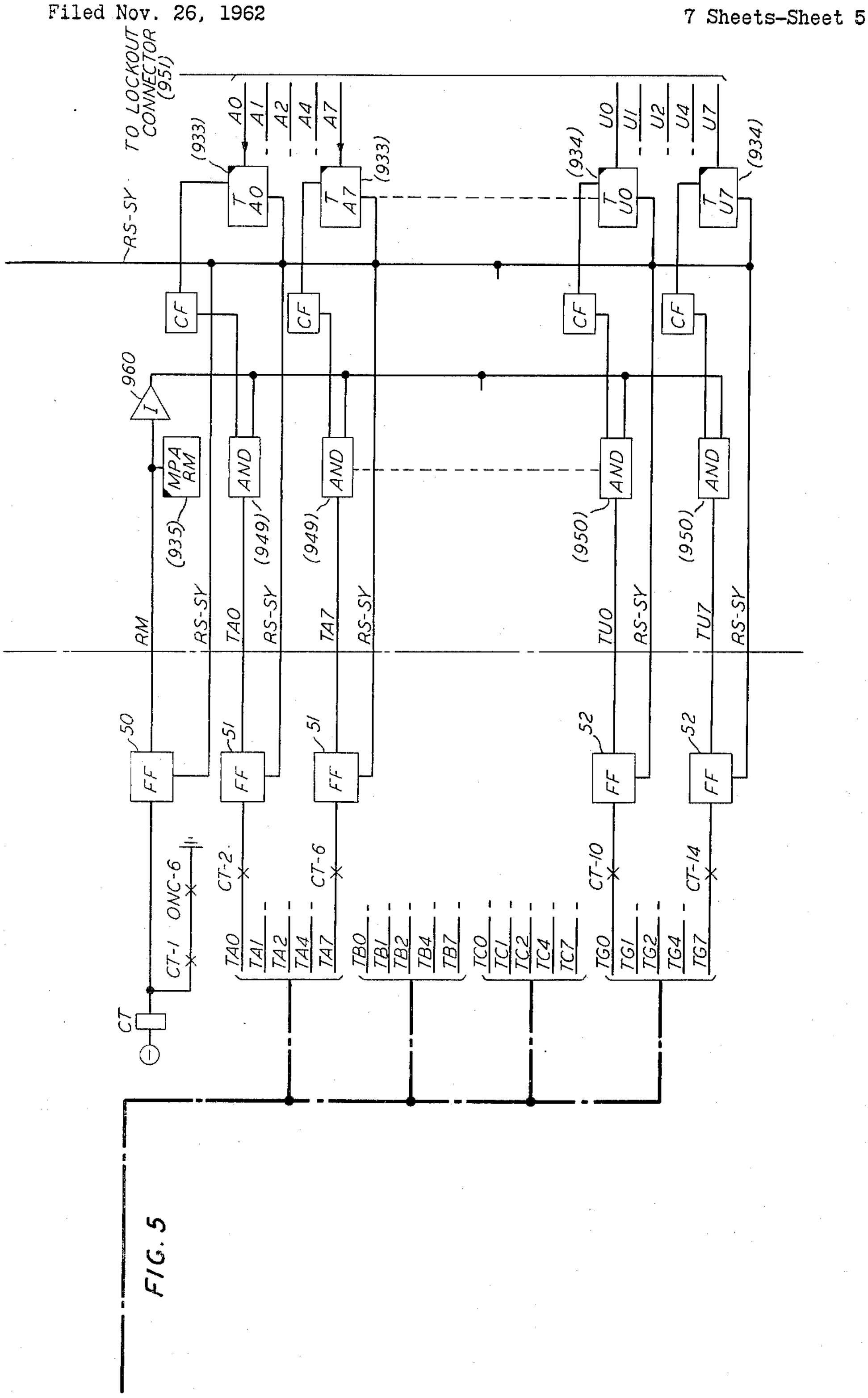

As disclosed in the Malthaner et al. patent, after a predetermined interval, a pulse is provided on the RS–SY lead of FIG. 4 in order to reset the previously operated toggles and thereby restore repertory translation consultor (915) to normal. As shown in FIG. 5, this lead may also be advantageously extended to reset flip-flops 50, 51, and 52 in control circuit 9.

Thus at this point, originating register 5 has received the called customer's directory number corresponding to the abbreviated dialing code. The read function is therefore completed, and the originating register causes the completion of the call to the called customer as disclosed in detail in the Busch patent. The subsequent release of originating register 5 in the course of completing this call restores relay (ON) to normal thus releasing relay ONC in FIG. 2. Originating register 5 and the associated control circuit 9 are then available to serve other originating connections.

III. *Detailed description—Abbreviated dialing write function and verification feature* (*FIGS.* 1, 2, 3, 4, 5, 6 *and* 7)

Section II described in detail the manner in which a customer controls the read function in order to complete an AD call. This section will describe the manner in which the customer controls the write function in order to add a directory number to his repertary, and in accordance with the invention, this section will then describe the verification of the write function whereby the read function is performed automatically.

The special service customer may from time to time desire to add a directory number to his repertory or may desire to change an existing directory number associated with a specific AD code. To indicate a requst to control the write function in such cases, the customer may, for example, be instructed to dial a two-digit code and await second dial tone and to thereupon dial the AD code followed by the desired directory number.

When the customer removes his receiver from the switchhook, dial tone is returned as hereinbefore described. The customer then dials the write function alerting code which may, for example, be the digits 98. These digits are recorded in the A and B digit registers 23 and 30, respectively, FIGS. 2 and 3, in a manner similar to that described hereinbefore. As disclosed in the Busch patent, the digit registers record each digit on the well known two-out-of-five basis; therefore, for the code 98, relays A2, A7 and B2, B7 (not shown) will operate in digit registers 23 and 30, respectively. The resultant grounding of the CA2, CA7, CB1, and CB7 leads, in response to the dialed code 98, operates the correspondingly designated relays in the control circuit 9A and B digit auxiliary registers 24 and 33, respectively. Relay CS of FIG. 2 also operates at this time as described in Section II.

Accordingly, interdigital timer 34, FIG. 3, is enabled by operated contacts CS–4, CA7–1, CA2–1, CB1–1, CB7–1, released contacts R–4, W–1, via lead DC, through a chain of released C0–C7 relay contacts in the C digit register in originating register 5 to ground on operated make contact (ON–15). Since the customer is dialing a write function alerting code comprising only two digits, no C0–C7 relays will be enabled at this time tnd timer 34 will function to operate relay T in control circuit 9.

The operated relay T completes the obvious operate path of relay W which locks operated through operated make contact W–5, released break contact RS–1, and operated make contacts ONC–4 to ground. The operation of relay W indicates to control circuit 9 that a customer entitled to the AD privilege has dialed an alerting code indicating a request to control the memory equipment write function.

Figure 6:
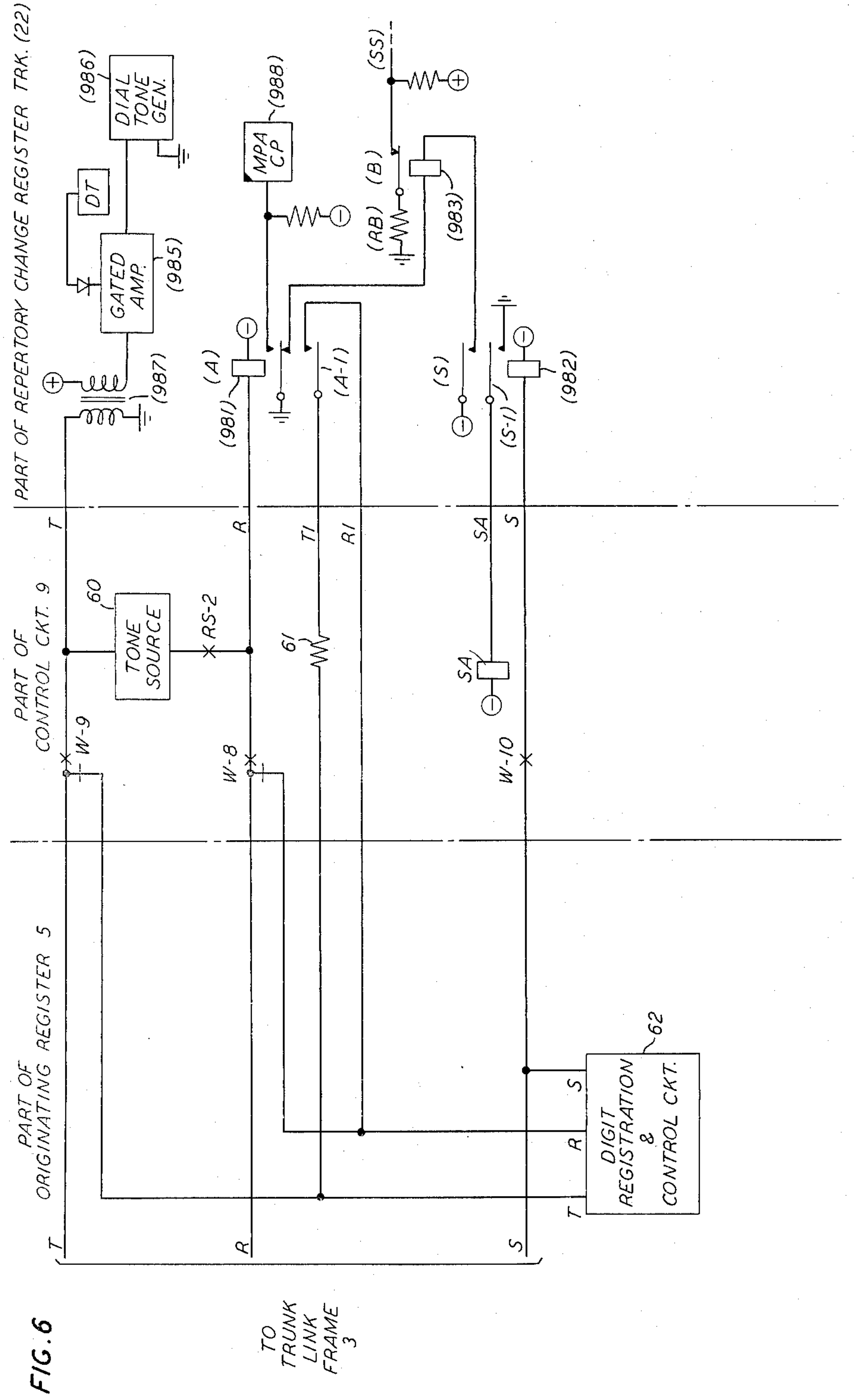

The operated relay W opens the holding ground for the relays in the A through G digit registers via operated W–break contacts in leads ONRA through ONRG in FIGS. 2 and 3 thus releasing the operated A2, A7, B1 and B7 digit registration relays in originating register 5 and preventing operation of the C0–C7 through G0–G7 registration relays at this time. As shown in FIG. 6, the operation of relay W also closes through the T, R, and S leads of the customer's line to repertory change register trunk 22 at contacts W8, W9 and W10.

As indicated hereinbefore, repertory change register trunk (22) detects and accumulates the digits dialed by a repertory customer and dispatches the line equipment information of the calling customer's line, the dialed repertory code and the directory number to be associated therewith to repertory administrator (1030), FIG. 1.

When the T and R leads of the customer's line are extended via contacts W–8 and W–9, FIG. 6, to repertory change register trunk (22), relay (981) therein will operate over the loop through the calling customer's station. With DT toggle normal in repertory changes register trunk (22), a negative signal voltage is applied through a diode to gated amplifier (985) as discussed in detail in the Malthaner et al. patent. Dial tone generator (986) thereupon supplies dial tone through gated amplifier (985) to the primary winding of transformer (987), and in this manner a second dial tone is transmitted over the line loop to the calling customer. The customer is thus alerted that he may commence dialing the AD code followed by the associated directory number.

Relay (S) in repertory change register (22) operates from ground present on the S lead of the customer's line. The operation of relay (S) provides negative battery to one side of the winding of relay (B) which does not operate at this time because of the previous operation of relay (A) as set forth in the Malthaner et al. disclosure.

When the customer's loop opens in response to the first break of the calling customer's dial contacts, relay (981) releases and in releasing operates relay (983). As disclosed in detail in the Malthaner et al. patent, each release of relay (981) generates a negative signal voltage to the input of CP monopulser (988), thereby forwarding this information to the dial pulse accumulator circuit. As further disclosed in the Malthaner et al. patent, the operation of relay (983) causes a positive signal voltage to be applied to the (SS) lead thereby causing the disabling of gated amplifier (985) and removing dial tone from the customer's line loop.

Relay (981) will release on each line opening produced by the dial contacts and will reoperate on each dial closure. Relay (983) is a slow release relay and will remain operated during each train of dial pulses representing each digit dialed by the customer, and will release only in the interdigital interval. As disclosed in detail in the Malthaner et al. patent, the alternate positive and negative signal voltage applied to the (SS) lead controls the operation of the successive stages of the steering circuit, so that the digits dialed by the calling customer are registered in their respective groups of register toggles.

Relay (981) may advantageously be provided with a make contact A–1 inserted across the customer's T and R leads via leads T1 and R1, so as to repeat these dial pulses to the originating register digit registration and control circuit 62. Relay (S) may also be advantageously arranged with an additional make contact S–1 so as to cause the operation of relay SA in control circuit 9 by an obvious circuit path. As shown in FIGS. 2 and 3, the operation of relay SA closes through the locking ground for the A and B digit registers 23 and 30 in originating register 5, via contacts SA–1 and SA–2 associated with the ONRA and ONRB leads, respectively. Therefore, the first two digits dialed by the customer, which constitute the AD code, will also be registered in originating register 5 on the A and B digit registers.

Figure 7:
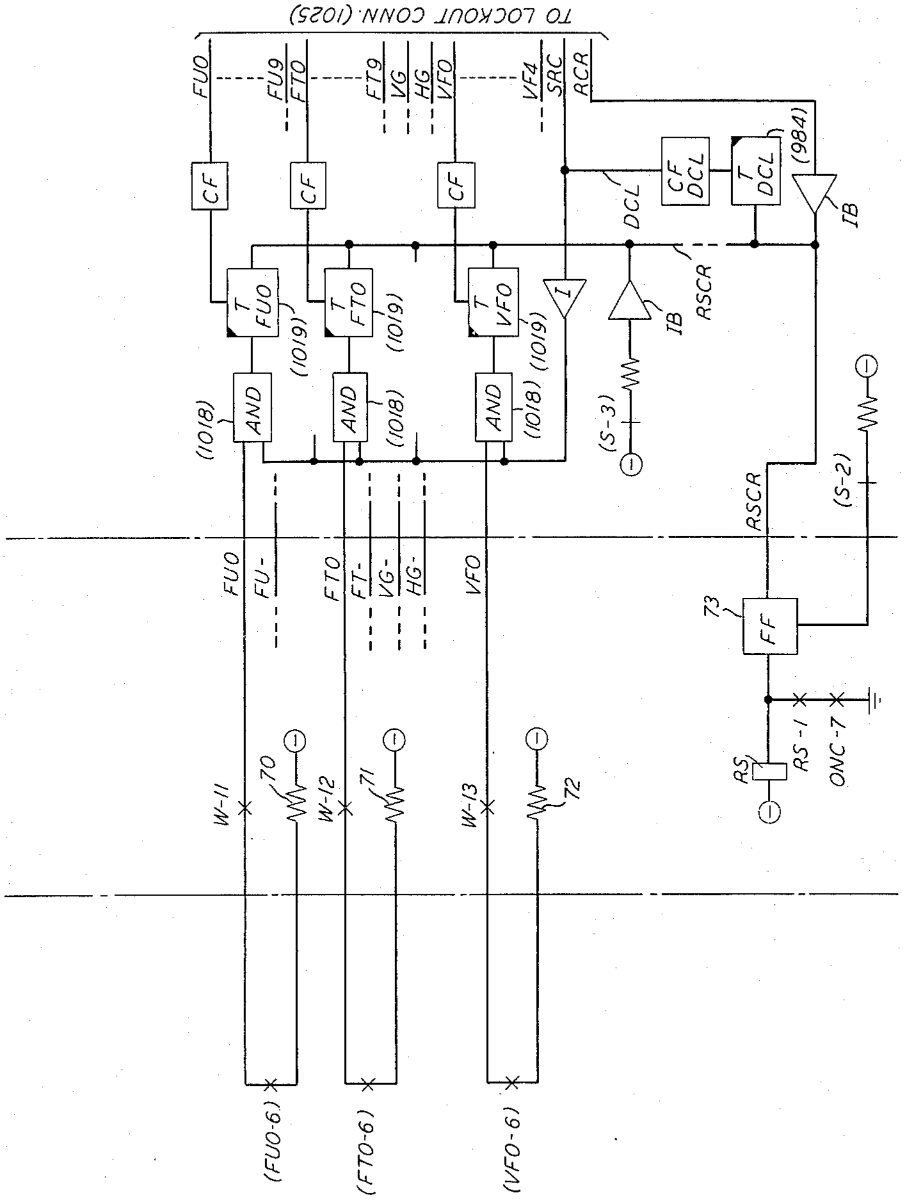

As disclosed in detail in the Malthaner et al. patent, the completion of dialing is indicated by the operation of DCL toggle (984) shown in FIG. 7, thereby providing a positive signal potential on lead DCL. This positive signal potential is applied through an inverter so as to place a negative signal potential on one input of each of the AND gates (1018). As described in Section II, the customer line equipment identification is manifested by operated FT-, FU-, VG-, HG-, and VF-relays in originating register 5. Therefore, those line identification leads, such as FUO, FTO, and VFO (typical) having negative battery potential thereon by virtue of operated make contacts, such as FUO–6, FTO–6, and VFO–6, are completed by operated contacts on relay W to enable the associated AND gates (1018). The corresponding toggles (1019) are thus operated, thereby providing the proper signal potentials on the correspondingly designated line identification leads to lockout connector (1025).

The positive signal potential on lead DCL is also applied directly to the SRC lead to lockout connector (1025), so that a start signal is passed to the repertory administrator (1030), FIG. 1, along with the line equipment signal voltages and the signal voltages for the repertory code and directory number dialed by the repertory dialing customer as set forth in detail in the Malthaner et al. disclosure.

When the repertory administrator (1030) has entered this information on repertory drum (30) as described in detail in the Malthaner et al. patent, a positive voltage is returned over the RCR reset lead, FIG. 7, to repertory change register trunk (22). This positive signal voltage is inverted and applied to the RSCR lead. In this manner the previously operated toggles are restored to normal. This negative potential present on the RSCR lead may advantageously be extended to enable flip-flop (73) in control circuit 9, thereby causing the operation of relay RS to indicate that repertory change register trunk (22) has completed the write function. Relay RS locks operated by an obvious locking path.

The closure of make contact RS–2, FIG. 6, causes the insertion of tone source (60) across the T and R leads of the customer's line. The tone source (60) may be arranged as well known in the art to return a momentary source of high tone distinguishable from dial tone, to indicate that the write function has been completed. At this time the customer may abandon the call if he so desires, thereby inhibiting the automatic enabling of the read function which will follow, as hereinafter described, if he fails to abandon the call.

If the customer were to abandon the call, relay (ON) would release in originating register 5 as described in detail in the Busch patent, thus opening the operate path of relay ONC, FIG. 2, in control circuit 9. The release of relay ONC opens the holding path of all operated relays in control circuit 9, thereby restoring the control circuit to normal.

Assuming that the customer does not abandon the call, the operation of relay RS enables break contact RS–1 thus releasing relay W in FIG. 3. As shown in FIG. 6, the release of relay W restores the continuity of the T and R leads of the customer's line to originating register 5. The ONRA through ONRG leads to the A through G digit registers in originating register 5 of FIGS. 2 and 3 are grounded via released break contacts on relay W. Contacts RS–4, FIG. 2, completes the obvious operate path of relay PR which locks operated through enabled make contacts PR–1 and ONC–2 to ground. The operation of relay PR completes the operate path of relay R and causes the activation of repertory translation consultor (915), FIGS. 4 and 5, as described in detail in Section II. Thus the abbreviated dialing code registered on the A and B digit auxiliary registers 24 and 33, FIGS. 2 and 3, in control circuit 9 in conjunction with the line identity information is utilized to read out of the memory equipment the directory number placed therein during the write function. This directory number information is returned to originating register 5 as described in Section II and the call is completed to the directory number location as disclosed in detail in the A. J. Busch patent.

Positive verification is therefore provided as to the information contained in repertory drum (30). If the call terminates to the directory number intended by the special service customer, the customer is then aware that he has properly exercised control of the write function, and further that no equipment mishap has introduced any error. However, if the call is completed to a directory number location other than that intended by the special service customer, the customer will be aware that the write function must be repeated in order to properly prime the repertory memory.

SUMMARY

While the equipment of this invention has been described with reference to a particular embodiment wherein a control circuit is arranged to automatically enable the abbreviated dialing read function upon completion of the abbreviated dialing write function, it is to be understood that such an embodiment is intended to be illustrative of the principles of the invention and that numerous other arrangements may be devised by those skilled in the art without departing from the spirit and scope of the invention.

For example, the invention may be used in a telephone central office arranged for centralized temporary transfer service. Thus, when the temporary transfer customer has primed the central memory with the transfer directory number in order to activate the service, the number is automatically read out of the memory and a connection is established to the location indicated by the stored number.

A further example would be the use of the invention in a central office arranged for centralized control of customer wake-up service.

Another example would be the use of the invention in a central office arranged for automatic establishment of a conference connection in response to the dialing of a single directory number.

Another example would be where the control circuit as set forth in the embodiment is arranged to distinguish between an alerting code indicating a request to perform the write function followed by automatic enablement of the read function and a different alerting code indicating a request to perform the write function only.

What is claimed is:

1. A central office including common memory equipment,
line connected to said centrol office comprising selectively operable signaling means for alternately controlling the writing of information in said memory equipment and the reading of information from said memory equipment, and
switching means operative upon completion of said writing of information in said memory equipment for automatically enabling said reading of information from said memory equipment.

2. The combination set forth in claim 1 wherein said switching means for further comprises means for inhibiting the automatic enablement of said reading of information from said memory equipment.

3. The combination set forth in claim 2 wherein said inhibiting means comprises apparatus operatively ressponsive to an on-hook signal of predetermined duration from a subset associated with one of said lines.

4. The combination set forth in claim 1 wherein said switching means further comprises means for returning a distinctive tone signal to said lines prior to said automatic enablement of said reading operation.

5. In a telephone system,
a central office,
customer lines including special service lines connected to said central office,
common memory equipment at said central office for storing switching control information only in response to signals from said special service lines, and
switching means automatically enabled in response to the storage of said switching control information for verifying to said special service lines the storage of said information.

6. In a telephone system,
a central office,
special service lines connected to said central office,
said central office comprising common memory equipment responsive to signals from said special service lines for storing directory numbers associated with said special service,
means automatically operative upon storage of one of said directory numbers for reading said stored directory number from said memory equipment, and
means for causing completion of a connection to the location indicated by said directory number read out of said memory equipment.

7. In a telephone system,
a central office,
special service lines connected to said central office,
said central office comprising common memory equipment responsive to signals from said special service lines for storing directory numbers and associated abbreviated codes, and
switching means comprising means for registering one of said abbreviated codes in response to said signals from one of said lines,
means operative upon storage of one of said directory numbers and said associated code and controlled by said registered code for causing the reading of said stored directory number from said memory equipment, and
means for causing completion of a connection to the location indicated by said directory number read out of said memory equipment.

8. In a telephone system,
a central office,
lines including special service abbreviated dialing lines connected to said central office,
centralized abbreviated dialing memory equipment in said central office connectable to said special service lines and responsive to signals from said special service lines for controlling the read function and write function of said memory equipment,
a plurality of registers in said central office operatively responsive to other signals from said special service lines,
switching means for connecting one of said registers to one of said special service lines,
control means associated with said connected register comprising a first relay operatively responsive to said other signals from said special service line indicating a request to control said write function,
switching means activated by said first relay for connecting said memory equipment to said line,
a second relay operatively responsive to a signal from said memory equipment for recognizing the completion of the control of said write function by said special service line,
a third relay enabled by the operation of said second relay for automatically enabling said read function, and
apparatus for forwarding the information provided by said enabled read function to said connected register,
said one of said registers comprising means for completing a connection between said special service line and another line as determined by said information.

9. The combination set forth in claim 8 wherein said control means further comprises a tone source controlled by said second relay and connectable to said special service line for a predetermined interval upon completion of said write function.

10. The combination set forth in claim 8 and further comprising means, including said third relay, responsive to a release signal from said register for inhibiting said automatic enablement of said read function.

No references cited.

ROBERT H. ROSE, *Primary Examiner.*

WILLIAM C. COOPER, *Examiner.*